United States Patent [19]

Yoshioka et al.

[11] Patent Number: 4,926,972

[45] Date of Patent: May 22, 1990

[54] METHOD OF AND APPARATUS FOR INJECTING LIQUID INTO BOOT FOR JOINT UNITS

[75] Inventors: Hiroshi Yoshioka; Nobuyoshi Nagatsuma; Shinobu Kobayashi, all of Sayama, Japan

[73] Assignee: Honda Giken Kogyo Kabushiki Kaisha, Tokyo, Japan

[21] Appl. No.: 324,529

[22] Filed: Mar. 16, 1989

[30] Foreign Application Priority Data

Mar. 18, 1988 [JP] Japan .................................. 63-65537

[51] Int. Cl.$^5$ .............................. F16C 1/24; B23P 11/00
[52] U.S. Cl. .................................... 184/109; 29/434; 29/450; 29/898.1; 464/15
[58] Field of Search .................... 184/88.2, 105.1, 6.18, 184/109; 464/15, 175; 29/148.4 L, 149.5 R, 434, 450

[56] References Cited

U.S. PATENT DOCUMENTS

| Re. 32,830 | 1/1989 | Hazebrook | 29/148.4 L |
|---|---|---|---|
| 2,795,038 | 6/1957 | Martiny | 29/450 |
| 3,646,778 | 3/1972 | Fisher | 29/434 |
| 4,558,869 | 12/1985 | Grove | 464/175 |
| 4,820,238 | 4/1989 | Uchida | 464/15 |

*Primary Examiner*—Douglas Hart
*Attorney, Agent, or Firm*—Armstrong, Nikaido, Marmelstein, Kubovcik & Murray

[57] ABSTRACT

The diametrically larger end of a boot abutted on the open end of a joint unit on a vertical posture driving shaft is separated from the open end and held there while a liquid such as a grease is injected through the opening thus created. The end of the boot is then fitted over the outer periphery of said open end. A boot opening/closing device for doing so includes a vertically movable clamping member for clamping the boot at a portion adjacent the larger end, moving it away from the open end, holding it there during injection of the liquid by a movable nozzle and fitting it.

3 Claims, 4 Drawing Sheets

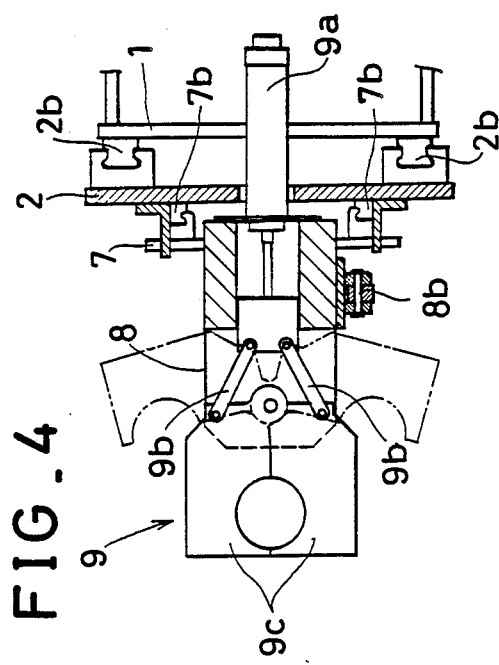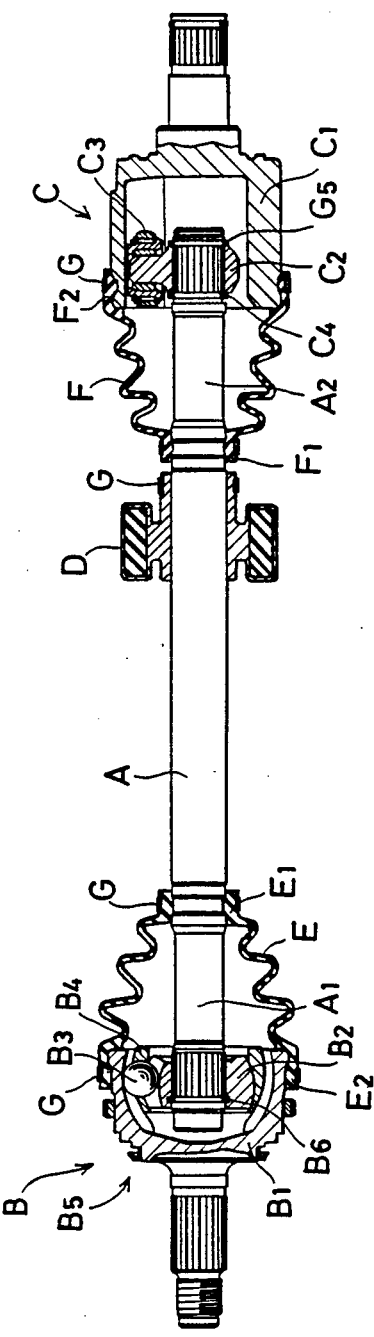

METHOD OF AND APPARATUS FOR INJECTING LIQUID INTO BOOT FOR JOINT UNITS

BACKGROUND OF THE INVENTION

This invention relates to a method of and an apparatus for injecting a liquid, such as grease, into a boot fitted over an end portion of a shaft, such as a vehicular drive shaft to which a joint unit, such as a constant velocity joint is assembled, the boot covering the open end of the joint unit.

An apparatus has been known from the published unexamined Japanese patent application TOKKAISHO No. 61-284329 for injecting a liquid into a boot for a joint unit. The boot and the joint unit are assembled to an end portion of a driving shaft with a diametrically larger end of the boot fitted over the outer periphery of an open end of the joint unit. The shaft held in a horizontal posture is conveyed to an injection station for injecting a liquid into the boot. The injection station is provided with an opening device adapted to clamp a diametrically smaller end of the boot, which is closely fitted to the shaft, at two locations on the outer circumferential surface thereof and press the diametrically smaller end there so as to move the two locations closer to each other to enable the intermediate portion therebetween to be slackened thereby in the radially outward direction. This forms an opening between the diametrically smaller end of the boot and the shaft for the liquid injection. A nozzle adapted to be inserted into this opening.

According to the above-described method, the diametrically smaller end of a boot is clamped to form an opening for injecting a liquid therethrough. This opening cannot be formed to a large size from a viewpoint of avoiding damaging the diametrically smaller end of the boot. This makes it impossible in some cases to insert the nozzle into the opening, and easily causes an incorrect injection of a liquid into the boot.

An object of the present invention is to provide a liquid injecting method and apparatus which are capable of solving these problems and injecting a liquid into a boot reliably.

SUMMARY OF THE INVENTION

The invention with a view to achieving this object, includes a method of injecting a liquid into a boot of a joint unit. The boot has a diametrically larger end fitted over an outer periphery of the open end of a joint unit assembled on an end portion of a shaft. The diametrically smaller end of the boot is closely fitted to the shaft, and then a liquid such as grease is injected into the boot. The invention is characterized in that, after the joint unit is assembled to the end portion of the shaft with the open end abutting on the diametrically larger end of the boot, the shaft is conveyed to a liquid injection station while held in a vertical posture with the end portion facing upward. The liquid is injected into the boot at the injection station while the diametrically larger end of the boot is separated from the open end, and then the diametrically larger end is fitted over the outer periphery of the open end.

The present invention further provides an apparatus for injecting a liquid into a boot of a joint unit which is designed to enable the liquid injection operation at the liquid injection station to be carried out automatically. The apparatus is characterized in that it has a boot opening/closing device comprising a vertically movable clamp member for clamping the boot at a portion adjacent to the diametrically larger end thereof, and a nozzle device provided with a nozzle movable toward and away from an open portion formed above the diametrically larger end of the boot when the larger end is lowered through a downward movement of the clamp member.

In the foregoing arrangement, the boot opening/closing device may be designed to further comprise a vertically movable lift frame and a vertically swingable frame mounted on the lift frame, with the clamp member being attached to the swingable frame.

The operation of the method according to the present invention using the liquid injecting apparatus will now be described.

When the shaft is conveyed to the injection station, the clamp member in the boot opening/closing device is closed, and the portion of the boot which is in the vicinity of the diametrically larger end thereof is clamped by the clamp member.

During this time, the shaft is held in its vertically extending posture with the joint unit-attached end portion thereof at the top. The diametrically larger end of the boot is thus in contact with the downwardly directed open end of the joint unit. When the clamp member is then moved down, the diametrically larger end of the boot is separated downwardly from the open end of the joint unit. Consequently, a clearance occurs between the diametrically larger end of the boot and the open end of the joint unit, so that the diametrically larger end of the boot is upwardly opened.

The nozzle in the nozzle device is then moved forward until it gets in the opened part of the diametrically larger end of the boot, and a liquid is then injected into the boot. After the injection of the liquid, the nozzle is moved back, and the clamp member is moved upward so as to fit the diametrically larger end of the boot over the outer periphery of the open end of the joint unit from therebelow to complete the injection operation.

The diametrically larger end of the boot is separated from the open end of the joint unit by swinging the clamp member downward by a movement of the swingable frame. According to this apparatus, the diametrically larger end of the boot is separated in an inclined posture from the open end of the joint unit so that the lower part of the downwardly inclined diametrically larger end of the boot is opened widely to facilitate the liquid injection into the boot.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 4 is a sectional plan view taken along the line IV—IV in FIG. 2;

FIG. 6 is a longitudinal sectional view of the driving shaft.

DETAILED DESCRIPTION OF THE PREFERRED EMBODIMENT

Figure 1:
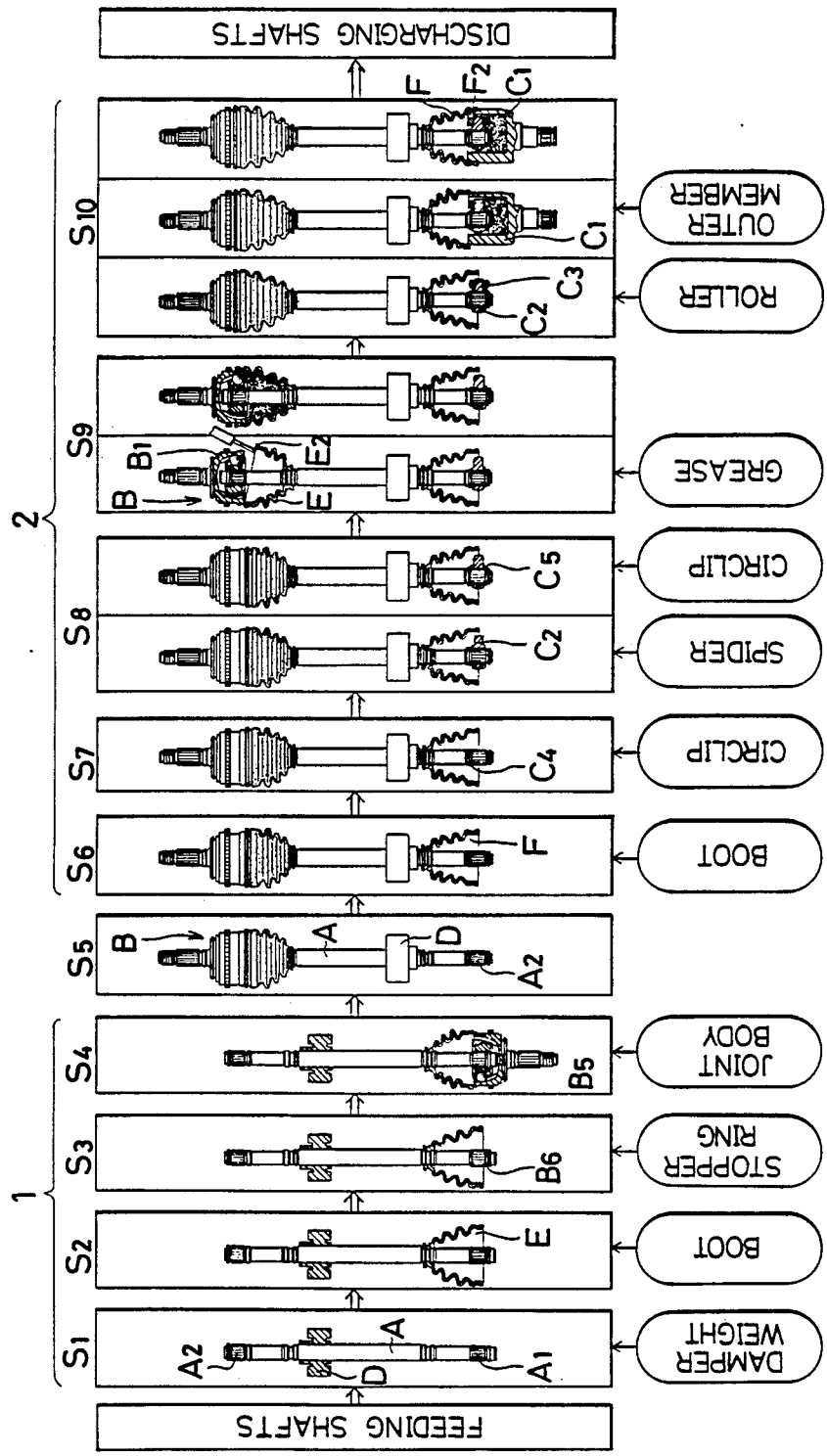
FIG. 1 is a diagram showing steps for assembling a drive shaft in which the liquid injecting step according to the present invention is incorporated.

The present invention can be used in a process for assembling a driving shaft A for a vehicle. The shaft A has a first joint unit B at one end portion $A_1$ thereof which can be a bell type constant velocity joint, and a second joint unit C at the other end portion $A_2$ thereof which can be a tripod type constant velocity joint. At an intermediate portion therebetween, a damper weight D can be provided, as shown in FIG. 6. The present invention is provided for injecting grease into a boot E for the first joint unit B.

Referring to FIG. 6, the first joint unit B includes a joint body $B_5$ having an outer member $B_1$, an inner member $B_2$, at least one ball $B_3$ and a retainer B assembled thereto, and a stopper ring $B_6$ for retaining the inner member $B_2$ in place on the drive shaft A. A diametrically larger end $E_2$ of a rubber boot E whose diametrically smaller end $E_1$ has been fitted over the drive shaft A is then fitted over the outer periphery of an open end of the first joint unit B, more specifically, an open end of the outer member $B_1$ so as to prevent foreign matter from entering the joint unit B. The second joint unit C comprises an outer member $C_1$, a spider $C_2$, rolers $C_3$ mounted on the spider $C_2$, and a pair of circlips $C_4$, $C_5$ for securing the spider $C_2$ on the drive shaft A. A diametrically larger end $F_2$ of a rubber boot F whose diametrically smaller end $F_1$ has been fitted over the drive shaft is fitted over the outer periphery of an open end of the outer member $C_1$ as in the case of the foregoing boot E.

Referring to the drawings, bands G are provided to fixing the boots E, F and a damper weight D. The bands are set around the parts after the shaft has been assembled.

FIG. 1 shows the steps of assembling the drive shaft A. A total of ten station $S_1$–$S_{10}$ are provided on a shaft conveying passage along which the drive shaft A is conveyed in a vertically oriented posture. First, the drive shaft A held in its vertical posture with one end portion $A_1$ thereof facing downward is conveyed to the first station $S_1$, at which the damper weight D is assembled on the drive shaft A. The boot E, the stopper ring $B_6$ and the joint body $B_5$ are then assembled to the one end portion $A_1$ at the second, third and fourth stations $S_2$, $S_3$, $S_4$, respectively, in that order. During this time, the diametrically larger end $E_2$ of the boot E is simply kept in contact with the open end of the outer member $B_1$ without being fitted over the outer periphery thereof. Then, at the fifth station, the drive shaft A is turned upside down to the opposite vertical posture with said one end portion $A_1$ facing upward for conveying thereof to the subsequent stations. The boot F is assembled to the other end portion $A_2$ of the shaft A at the sixth station $S_6$, the circlip $C_4$ at the seventh station $S_7$, and the spider $C_2$ and the circlip $C_5$ at the eighth station $S_8$, respectively. At the ninth station $S_9$, grease is injected into the boot E for the first joint unit B positioned at the top after partially separating the diametrically larger end $E_2$ of the boot E from the open end of the outer member $B_1$. After the injection operation has been completed, the diametrically larger end $E_2$ is re-fitted over the outer periphery of the open end of the outer member $B_1$. At the tenth station $S_{10}$, the rollers $C_3$ is assembled to the spider $C_2$, and the outer member $C_1$ into which grease has been injected in advance is fitted over the spider $C_2$, the diametrically larger end $F_2$ of the boot F being fitted over the open end of the outer member $C_1$.

The ninth station $S_9$ is provided with an injection device for use in carrying out the above-mentioned grease injection operation automatically, which injection device will now be described in detail.

Figure 2:
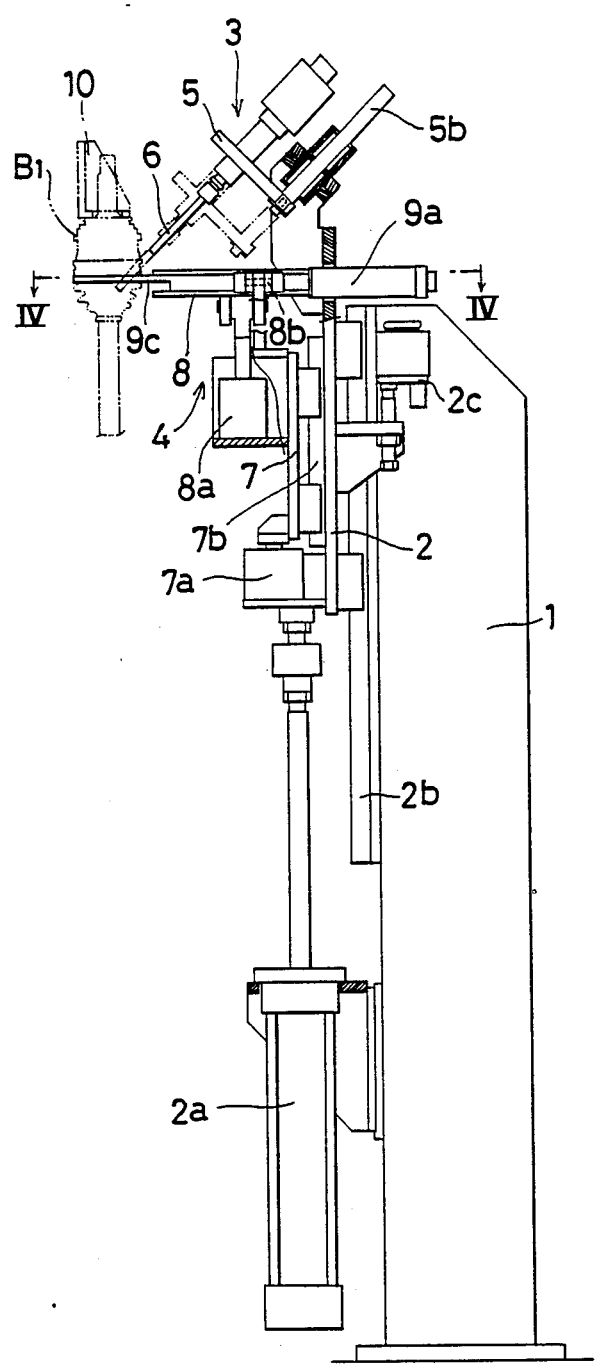
FIG. 2 is a sectional view of an example of the liquid injecting apparatus according to the present invention.
Figure 3:
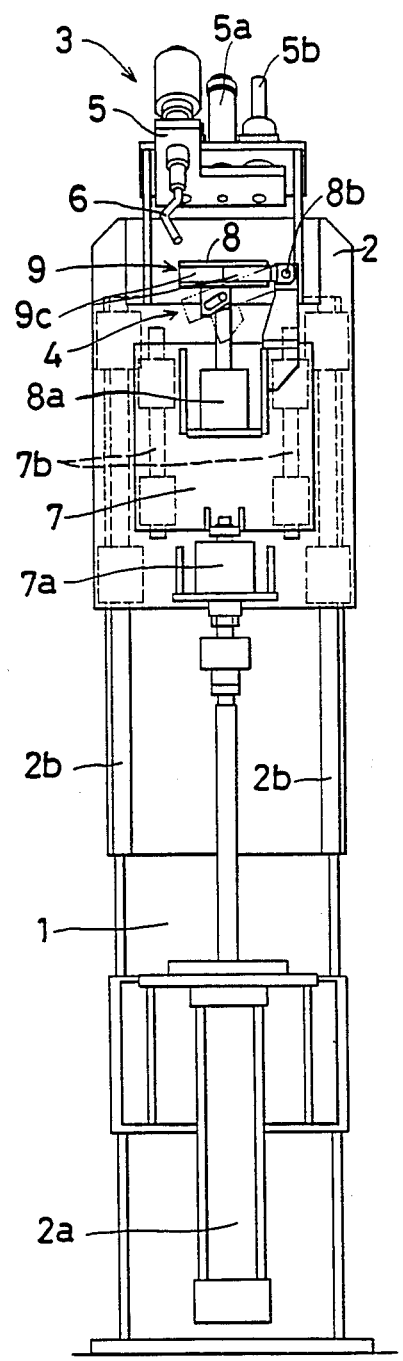
FIG. 3 is a front view of the apparatus of FIG. 2.

The details of this injection device are shown in FIGS. 2 and 3. A support post 1 erected on one side of a shaft stopping position at the ninth station $S_9$ is provided with a base frame 2 which is moved upward along guide rails 2b by a cylinder 2a and positionally adjusted by a rotary stopper means 2c to a height determined according to the type of the drive shaft A. A nozzle device 3 and a boot opening/closing device 4 are mounted on the base frame 2.

The nozzle device 3 consists of a movable frame 5 provided on the upper end portion of the base frame 2 and moved forward and backward in the diagonally downward direction by a cylinder 5a and a guide bar 5b. A nozzle 6 is attached to the movable frame 5 and extends in the diagonally downward direction. The boot opening/closing device 4 consists of a lift frame 7 provided on the base frame 2 and moved up and down along guide rails 7b by a cylinder 7a, a swingable frame 8 provided on the lift frame 7 and adapted to be swung in the vertical direction about a pivot 8b by a cylinder 8a, and a clamp member 9 attached to the swingable frame 8 including a pair of clamp arms 9c, 9c adapted to be opened and closed via links 9b by a cylinder 9a, as shown in FIG. 4.

A positioning member 10 engages with a stepped surface of the shank of the outer member $B_1$ so as to hold the outer member $B_1$ in its vertical posture and is moved up and down by a cylinder (not shown).

Figures 5A, 5B:
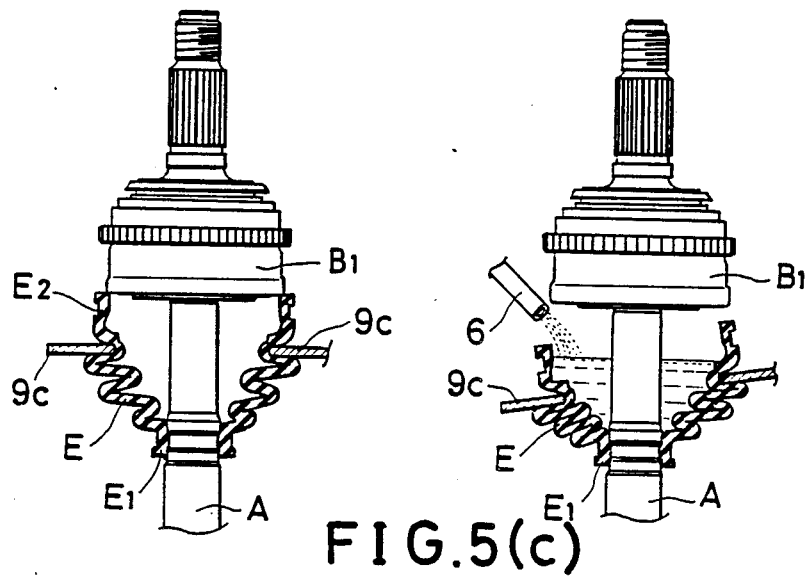
FIGS. 5(a)–5(c) illustrate the operation of this apparatus.

For injecting grease into the boot E, the clamp arms 9c, 9c are closed first, as shown in FIG. 5(a), to clamp the boot E at a portion adjacent to the diametrically larger end $E_2$ thereof which is in contact with the open end of the outer member $B_1$. The swingable frame 8 is then swung downward so as to lower the diametrically larger end $E_2$ while twisting the boot E. This causes the diametrically larger end $E_2$ of the boot E to be separated in an inclined posture from the open end of the outer member $B_1$ so that the inclined diametrically larger end $E_2$ is opened widely at the part thereof closer to the downward inclined side with respect to the outer member $B_1$ as shown in FIG. 5(b). In this condition, the movable frame 5 of the nozzle device 3 is then moved in the diagonally downward direction so as to have the tip of the nozzle 6 face into the widely opened part between the diametrically larger end $E_2$ and the outer member $B_1$. A predetermined quantity of grease is injected from the nozzle 6 into the boot E. If the diametrically larger end $E_2$ is lowered in its horizontal posture to the same level as that of the location of the above-mentioned widely opened part, the boot as a whole is compressed into a flattened state. Consequently, the capacity of the boot compressed to said level in such a horizontal posture is smaller as compared with that of the boot whose diametrically larger end is lowered in an inclined posture, and a required quantity of grease cannot be injected into the boot in some cases.

Figure 5C:
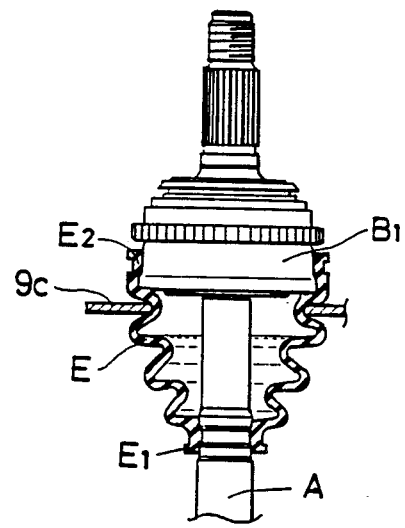

After the injection step has been completed, the nozzle 6 is moved back, and the swingable frame 8 is swung up to the original horizontal position. The lift frame 7 is moved up so as to push the diametrically larger end $E_2$ up by the clamp member 9 and fit the same over the periphery of the open end of the outer member $B_2$ as shown in FIG. 5(c), whereby the injection operation is completed.

Alternatively, although the construction of the boot opening/closing device 4 becomes complicated, the clamp member may be formed so that it can be moved vertically and horizontally. In this arrangement, a part of the circumferential region of the diametrically larger end $E_2$ may be separated in the diametrically outward direction of the open end of the joint unit by a horizontal movement of the clamp member 9 so as to enable injection of grease into the boot E therethrough.

As may be clear from the above description, the liquid injecting method includes the steps of setting the shaft in a vertical posture, and injecting a liquid into the boot from above the upwardly facing, diametrically larger end thereof, which is separated from the open end of the joint unit. According to this method, which is different from a conventional method of this kind in which a part of the diametrically smaller end of a boot is slackened forcibly in the diametrical direction so as to form an opening through which a liquid is to be injected, a liquid can be injected reliably through the opened part of the diametrically larger portion of the boot into the interior thereof without applying any unduly large force to the boot.

The frequency of injection errors can be reduced greatly. According to the liquid injecting apparatus described, the injection of a liquid into the boot and the fitting thereafter of the boot onto the open end of the joint unit are carried out automatically by the operations of the boot opening/closing device and the nozzle device. The diametrically larger end of the boot can be separated in an inclined posture from the open end of the joint unit so as to open the inclined diametrically larger end of the boot more widely at the part thereof closer to the downward inclined side. This enables a liquid to be injected easily into the boot, and the frequency of injection errors to be further reduced.

It is readily apparent that the above-described invention has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of injecting a liquid into a boot for a joint unit, the boot having a diametrically larger end fitted over an outer periphery of an open end of a joint unit assembled to an end portion of a shaft, and a diametrically smaller end closely fitted to the shaft, comprising: after the joint unit is assembled to the end portion of the shaft with the open end abutting on the diametrically larger end of the boot, conveying the shaft to a liquid injection station while held in vertical posture with said end portion facing upward, separating and holding the diametrically larger end of the boot from said open end, injecting the liquid into the boot, and then re-fitting the diametrically larger end over the outer periphery of said open end.

2. An apparatus for injecting a liquid into a boot for a joint unit, said apparatus being installed at a liquid injection station to which a shaft with a joint unit attached to an end portion with an open end in contact with a diametrically larger end of the boot is conveyed while held in a vertical posture with said end portion facing upward, comprising a boot opening/closing device including a vertically movable clamp member for clamping the boot at a portion adjacent to the diametrically larger end thereof, and means for moving the clamp member, and a nozzle device provided with a nozzle movable toward and away from an open portion formed above the diametrically larger end of the boot when said larger end is lowered through a downward movement of the clamp member and means for moving the nozzle.

3. An apparatus for injecting a liquid into a boot for a joint unit according to claim 2, wherein said means for moving the clamp member includes a vertically moveable lift frame, means for moving the lift frame, a vertically swingable frame mounted on the lift frame, the clamp member being attached to the swingable frame, and means for swinging the swingable frame.

* * * * *